US012603603B2

(12) United States Patent
Sinn

(10) Patent No.: US 12,603,603 B2
(45) Date of Patent: Apr. 14, 2026

(54) SOLAR ENERGY SYSTEM ON LAND AND WATER

(71) Applicant: SINN POWER GmbH, Gauting (DE)

(72) Inventor: Hans-Werner Sinn, Gauting (DE)

(73) Assignee: SINN POWER GMBH, Gauting (DE)

( * ) Notice: Subject to any disclaimer, the term of this patent is extended or adjusted under 35 U.S.C. 154(b) by 0 days.

(21) Appl. No.: 19/136,188

(22) PCT Filed: Dec. 5, 2023

(86) PCT No.: PCT/EP2023/084303
§ 371 (c)(1),
(2) Date: Jun. 5, 2025

(87) PCT Pub. No.: WO2024/121131
PCT Pub. Date: Jun. 13, 2024

(65) Prior Publication Data
US 2026/0005643 A1      Jan. 1, 2026

(30) Foreign Application Priority Data

Dec. 5, 2022      (DE) .......................... 102022004547.8

(51) Int. Cl.
*H02S 20/30*      (2014.01)
*H02S 20/32*      (2014.01)
(52) U.S. Cl.
CPC .............. *H02S 20/30* (2014.12); *H02S 20/32* (2014.12)
(58) Field of Classification Search
CPC ................................. H02S 20/30; H02S 20/32
See application file for complete search history.

(56) References Cited

U.S. PATENT DOCUMENTS 5,632,823 A * 5/1997 Sharan .................... F24S 25/12
353/3
6,662,801 B2 * 12/2003 Hayden ................. F24S 30/452
126/600
11,165,384 B1 11/2021 Mccabe
(Continued)

FOREIGN PATENT DOCUMENTS

CN      107026601 A      8/2017
CN      114592472 A      6/2022
(Continued)

OTHER PUBLICATIONS

DE 10 2006 049690 A1 English translaiton provided by FIT database, translated on Nov. 13, 2025.*
(Continued)

*Primary Examiner* — Golam Mowla

(57)      ABSTRACT

Solar energy system with at least one solar panel which is firmly held in a frame. In an essentially vertical or upright default position, the frame holds the solar panel in an essentially vertical or upright position. The frame can be tilted out of the default position about a substantially horizontal tilting axis in the vertically lower area of the solar panel or about a substantially horizontal tilting axis extending below the solar panel when a deflection force acts on the solar panel transversely to the tilting axis. When the deflection force is released, the frame automatically returns around the tilting axis towards the default position, for example by means of a restoring weight.

18 Claims, 16 Drawing Sheets

(56)                    References Cited

U.S. PATENT DOCUMENTS

| | | | | |
|---|---|---|---|---|
| 2003/0062037 A1 * | 4/2003 | Hayden | ................ | F24S 30/452 |
| | | | | 126/600 |
| 2010/0077592 A1 | 4/2010 | Casano | | |
| 2014/0261637 A1 * | 9/2014 | Okandan | ................ | H02S 20/10 |
| | | | | 136/251 |
| 2017/0133979 A1 * | 5/2017 | Asbeck | .................. | H02S 20/30 |
| 2019/0280641 A1 | 9/2019 | Owen | | |
| 2022/0376649 A1 * | 11/2022 | Praca | ..................... | H02S 20/10 |

FOREIGN PATENT DOCUMENTS

| | | | | | |
|---|---|---|---|---|---|
| DE | 102006049690 A1 | | 5/2008 | | |
| DE | 102006054531 A1 | * | 5/2008 | ............ | F24S 30/452 |
| DE | 202014101685 U1 | | 4/2014 | | |
| EP | 2669596 A1 | | 12/2013 | | |
| EP | 3845826 A1 | | 7/2021 | | |
| EP | 4277118 A1 | | 11/2023 | | |
| KR | 101615312 B1 | | 4/2016 | | |
| WO | 2015029728 A1 | | 3/2015 | | |

OTHER PUBLICATIONS

WO 2015/029728 A1 English translaiton provided by FIT database, translated on Nov. 13, 2025.*
International Search Report & Written Opinion for PCT Application No. PCT/EP2023/084303, mailed Jun. 13, 2024; 18 pages.

\* cited by examiner 12  12  12  12  12  12  12  12  12  12  12  12

3, 4

9

10

10

11

11

11

SOLAR ENERGY SYSTEM ON LAND AND WATER

FIELD OF THE INVENTION

The invention relates to solar energy systems which are used on land, buildings or on water bodies. Within the scope of the present invention, this relates to the installation referred to in the prior art as mounting, both individually and as a grouping of solar panels to form a solar energy system, which can be installed on land, on a building or on water bodies.

BACKGROUND OF THE INVENTION

In the state of the art, solar energy systems are essentially immovably installed or electromechanically mounted to track the sun. The challenge here is to find a mechanical connection that can withstand the forces of geo-influences such as wind, snow, currents, or waves.

Depending on the region, snow can exert large surface forces on essentially horizontal solar systems. Essentially vertical mounting of solar systems is advisable, as the horizontal surface on which snow can remain only affects the vertical upper edge of the solar system and is therefore very small.

Wind is a major challenge for solar systems. As solar systems physically require a large area to capture the rays of the sun, this places the greatest demands on the mounting of solar energy systems. Wind can cause massive surface forces and loads on conventional solar systems, both horizontally and vertically, as well as a combination of these forces.

The same applies to currents in the water or wave impact. If these hit the solar surface at right angles, extremely high forces can arise that are almost impossible to deal with mechanically and economically. To avoid damage to the solar panels caused by geo-forces such as wind, waves, snow and driving/heavy rain, the state of the art suggests using gravity. According to the state of the art, the solar panels can be hung like "laundry on a washing line". When geo-forces are applied, the solar panel is deflected. As soon as the geo-force decreases, the solar panel swings back to its original position. However, the costs and installation effort for such a suspended solution are considerable. Even for a small to medium-sized solar park, a large number of posts will be required, which must be individually anchored in a stable location, often with a foundation, in order to withstand the high loads of the swinging solar panels.

WO 2015/029728 A1 shows a solar cell system comprising a horizontal rod, wherein at least one solar cell panel is suspended from the horizontal rod such that it can swing in a direction that is approximately perpendicular to the longitudinal direction of the horizontal rod.

In vertical or suspended systems, the deflection is less than 360° and therefore the energy, whether electricity or heat, can simply be transmitted via flexible cables.

DE 10 2006 049 690 A1 relates to a wind load-dependent adjustable solar module support, consisting of a module support frame on which the solar modules are arranged and which can be pivoted about a main axis arranged so as to be displaced downwards in the direction of the installation surface. The main axis is supported on a mast or frame and runs essentially parallel to the installation surface of the mast or frame. The desired inclination of the module support frame is achieved by means of springs, dampers and link chains that automatically transmit counteracting and balanced torques to the main axis. A change in the equilibrium of the torques is caused by a changing wind load, which generates a torque on the main axis, whereby the module support frame moves into a horizontal position in a load-dependent manner to (re-)establish the equilibrium of all torques then acting on the main axis.

DE 20 2014 101 685 U1 relates to a photovoltaic installation which comprises at least two solar modules and one or more pivot axes to which the at least two solar modules are coupled or to which the at least two solar modules are connected in a rotationally fixed manner. A rotary movement of the respective pivot axis can thus be used to adjust the inclination of the solar module or modules connected to the respective pivot axis. A liquid container on the rear of the solar panels is used as a damping element to dampen the oscillation of the solar modules when they are deflected by wind loads, for example.

SUMMARY OF THE INVENTION

The invention therefore aims to find a mechanical as well as economical solution to the effect that the mounting as well as the installation is possible with simple mechanical means, whereby the solar panels should not be damaged even under the influence of geo-loads or geo-forces.

To solve this problem, the solar modules/solar panels should be attached to an axis in a tilt-flexible manner so that when geo-forces act on the solar surface, they align themselves at right angles to the direction of the force. The tilting axis is preferably located outside the solar surface. However, the tilting axis can of course also be located across the solar panel surface. In the invention, the principle of rigid connection should be reversed, and the solar system is to conform to the geo-forces.

The invention describes a solar energy system with at least one solar panel that is fixedly accommodated in a frame which, in a substantially vertical or upright basic position, also holds the solar panel in a substantially vertical or upright position. The frame with the solar panel(s) contained therein can be tilted out of the basic position about a substantially horizontal tilting axis in the vertically lower area of the solar panel(s) or about a substantially horizontal tilting axis below the solar panel, when a deflection force acts on the solar panel, for example a geo-force, such as wind or waves, or another force with a horizontal force component perpendicular to the tilting axis. The frame can evade this force and thus prevent damage to the solar panel(s) respectively reduce the supporting forces on the ground, a rack, or a mobile device, which would be much higher if the frame and the at least one solar panel were immovably mounted. According to the invention, when the deflection force decreases, the frame can preferably automatically return around the tilting axis back towards the basic position.

Flexible mounting of solar panels can dramatically reduce the effort required to secure the solar connection. In particular, it is possible to avoid flow loads such as wind or water loads, but also impulse loads caused by wind or water. A horizontal force on the solar structure is greatly reduced in systems that are exposed to wind. Likewise, suction or pressure loads on the system are minimized. In this way, however, unintentional, or intentional mechanical loads can be kept away from the solar energy system according to the invention since it can evade the loads. This evasion also reduces the supporting forces on the ground, which often means that anchoring with a foundation can be avoided.

The invention concerns a method of mounting solar panels that can be expanded to any size of solar system, on land or water. The solar panels can be installed essentially vertically and can be deflected by external geo-influences of flows or impulses on the solar surface, perpendicular to it, in the corresponding direction of force and automatically return when the deflecting force decreases.

The mounting method involves installing the solar panels in an upright position and returning them using, for example, a pendulum weight, a mechanical spring force, an electrical or electromechanical or a magnetostatic or electromagnetic force. Accordingly, such systems require much less anchoring or weighting for stability and can be built more easily and cost-effectively overall.

One embodiment of this solar system should be a self-erecting pendulum geometry. A pendulum weight returns the panels essentially vertically. It is clear to those skilled in the art that the axis of rotation can be a "real axis" or also a rounded base.

It is also clear to an expert that the starting point in the rest position before the application of external force does not necessarily have to be vertical but can also be at an angle to the vertical. This means, for example, that a certain south-facing orientation can be set in the basic setting.

The mounting method also has the characteristic that the solar panels are in a resting/home position without the influence of external geo-forces, whereby they can be held in a home position not only in an essentially vertical orientation but also, for example, at an angle to the vertical. For this purpose, the solar panels can be mounted in the frame so that they can be rotated around a substantially horizontal axis with respect to the vertical, with the frame itself being aligned substantially vertically. This can be easily achieved in a skillful manner using the above-mentioned restoring forces, for example by means of an eccentrically mounted restoring weight or pendulum weight or a spring stop that tilts the frame slightly out of the vertical. There are many technical solutions for this, all of which are covered by the invention.

The frame is preferably designed in an open-top embodiment. In this way, the at least one solar panel can be held laterally by means of two rails, which are connected below the solar panel, for example, by the restoring weight/pendulum weight. This creates, for example, an open-top frame, which can be closed at the top, for example, with a crossbar for greater rigidity in another design.

However, the invention also encompasses frames that have several fields, with a standard-sized solar panel being able to be accommodated in each field. Since many conventional designs are also conceivable here for how a frame can be designed to accommodate one or more solar panels, all these designs are covered by the spirit of the invention. For example, several solar panels are mounted on a solar system in a planar manner to one another, wherein the solar panels arranged in a planar manner to one another can have a common reset mechanism, for example a common restoring weight, or several solar systems are connected to one another via their respective frames, and thus form a modularly constructed surface composite having a multiplicity of tilting mechanisms in a planar arrangement to one another, and to be connected to each other in a larger solar system. Such larger solar systems are often set up with solar panels arranged in rows, so that it is conceivable that all solar panels in a row are connected to each other and can only tilt together. In this way, ensuring that a higher force is required to tilt all solar panels out of the vertical, thus requiring a certain minimum deflection force to avoid unnecessary swinging at loads below a predefined load limit for the solar system, which can lead to efficiency losses, since the area projected to the sun's rays decreases due to such pendulum movements. Another reason to define a minimum deflection force in advance is to provide a constant direct current for as long as possible to an inverter that is necessary to convert the current from DC to AC, or to a battery that needs to be charged, or to other consumers, and not constantly changing currents when, for example, there is only a light wind or a bird is sitting on the solar system.

As the expert will easily recognize, a minimum deflection force can also be defined for each individual, possibly free-standing, solar system according to the invention. Such a minimum force for deflecting a solar panel of a solar installation according to the invention can be achieved, for example, by a suitable spring preload of the return springs or, for example, by a magnetic lock or detent, whereby the minimum deflection force can be adjusted via the magnetic force. In this case, a magnet or a magnetic counter-element can be attached rigidly or elastically to the movable part of the frame or to the restoring weight, with the associated counter-element or magnet being attached correspondingly elastically or rigidly to a stationary part of the solar energy system.

When defining the amount of the minimum deflection force, for example, a force can be considered that is so high that the frame with the at least one solar panel accommodated in it can only be swung out of its rest position/basic position when the deflection force is greater than a force that would arise if a wind load with wind force 2 would act on the solar panel. The force definition given here for a minimum displacement force is, however, purely exemplary and depends on many other parameters, such as the solar panel area, the rigidity of the frame, the type of solar panel used, the operating conditions, etc.

The solar energy systems according to the invention are used for the elevation of the solar panels in an east-west orientation, in which the essentially vertical alignment of the solar panels over the course of the day yields a higher output than an alignment inclined at 20° or more, as it is advantageous for a south-facing alignment of the solar panels. According to the invention, therefore, bi-facial solar panels are used in the east-west installation, with which solar energy yields can be achieved on both sides, whether through direct or indirect sunlight. Therefore, in one embodiment of the invention, it is preferred that the solar panels of a solar energy system according to the invention rest in the essentially vertical basic position without the influence of geo-forces, in order to achieve the highest possible efficiency. As already explained above, "essentially vertical" in the context of this invention also includes a slight inclination with respect to the vertical, for example in the range of less than +/−15° with respect to the vertical. Such small deviations may be preferred, for example, in northern latitudes, where the sun does not reach the vertical solar zenith or only reaches it briefly over the course of the year. In this case, a higher yield of solar energy can be achieved than with a purely vertical alignment by means of a suitable alignment through reflection effects over the course of the day. However, a vertical basic alignment with, for example, bifacial PV cells is planned, since this also largely avoids the possibility of snow loading, which hardly can be taken into account in the design.

Such reflection effects occur in particular with water-supported solar systems with bifacial solar panels, since the water surface benefits such reflections, especially in calm or almost calm waters. The solar systems according to the invention are therefore designed in a way that they have a float that is mounted on the frame below the solar panel and that is suitable for keeping the solar panel floating above the surface of the water, with a restoring weight/counterweight being arranged below the surface of the water.

In another embodiment of the floating solar system according to the invention, the restoring weight is integrated in the buoyancy body. Such an embodiment is characterized by a low draught and is therefore suitable for shallow waters, such as shallow waters. Even if the water temporarily dries up completely, the principle of the invention continues to work and then behaves like the land-based "stand-up manikin" variant.

In this embodiment, the tilting axis runs through the floating body floating on the water surface, depending on how deeply the body enters the water. In this embodiment, too, the reset can be done solely by the force of gravity, but it can also be supported by other reset forces, such as spring forces, magnetic, mechanical, electromagnetic, or electromechanical forces. Here, too, the forces can be designed in such a way that a predefined minimum deflection force is required to tilt the solar panel out of the essentially vertical resting position.

The above-described floating embodiment on water illustrates in a simple form the basic principle of the invention: A solar panel mounted in a frame can be tilted out of its essentially vertical initial/basic position by the application of a deflection force, e.g. a geo-force, and automatically returns towards its initial position when the deflection force is released. In the case of the floating embodiment, this is achieved by the counterweight, which is arranged opposite the solar panel with respect to the floating body. This basic principle of the invention can be applied to land-based embodiments to provide tiltable solar panels in which a solar panel evades a deflection force by tilting away before damage occurs to the solar panel.

In an exemplary land-based embodiment of the solar energy system according to the invention, the frame has a restoring weight in the lower area in the form of a foot that is convexly curved transversely to the tilting axis, on which the solar energy system can be tilted in the manner of a "round-bottomed doll". A suitable design, for example a flattening of the contact surface, can also be used here to predefine a minimum deflection force so that the solar panel only tilts out of the essentially vertical basic position when the minimum force is exceeded.

In a further land-based embodiment of the invention, the frame is tiltable mounted in a rack, for example standing on the ground, with the essentially horizontal tilting axis running in the vertically lower area of the solar panel or below the solar panel. When a force acts on the solar panel transverse to the tilting axis, the solar panel of the solar installation according to the invention can tilt out of the basic position, whereby a restoring weight, which is arranged opposite the solar panel with respect to the tilting axis, generates a restoring counterforce that returns the solar panel to the essentially vertical basic position when the deflecting force decreases.

In this embodiment, the frame with the solar panel housed in it, together with the counterweight arranged at the bottom of the frame, forms a first assembly that can tilt about the tilting axis. The tilting axis, which preferably runs in or parallel to the underside of the solar panel surface, is held by the second assembly, the frame or rack, so that both assemblies can tilt relative to each other about the tilting axis. In a further embodiment of the invention, the frame can be set up and/or anchored in a fixed position on the ground. The set-up variant is thus also transportable, which means that the solar system according to the invention can also be used on mobile devices. Thus, the land-based embodiment can be used in a stationary manner in fields, gardens, terraces, squares, on roofs, e.g., flat roofs or industrial roofs, etc., and as a mobile power source on loading areas of vehicles, transport trailers or ships, etc. This also makes it possible to use the solar system according to the invention on a temporary basis, for example to supply events such as public festivals, rallies, or exhibitions with solar power. Due to the greatly reduced horizontal and vertical forces, corresponding systems can also be placed on "wheels", for example as mobile systems, in order to ensure flexible mobile decentralized power generation. The greatly reduced forces make it possible to design a stationary, non-anchored frame that is relatively light and therefore cost-effective. Even if one decides on a ground-anchored variant for the frame, the anchoring can be dimensioned to be considerably smaller. It can, of course, be combined with battery systems or thermal storage units, so that a mobile energy supply can be easily set up.

In particular, in the case of the land-based embodiment of the solar energy system according to the invention, a reset or counterweight is not absolutely necessary to swing back a solar panel that has been deflected by, for example, geoforces, into its essentially vertical basic position. As the skilled person will readily appreciate, this can also be achieved by elastic, mechanical, electromechanical, magnetic, or electromagnetic forces, or by a combination of these forces. However, the most robust design is to reset a deflected solar panel by suitably attaching a restoring weight, since the weight force is not subject to material fatigue or wear. In addition, when a solar panel is set up rotatably with a frame, the center of gravity always moves to the other side of the axis of rotation than the point of application of the deflection force when it is deflected. The horizontal forces acting on the frame at the pivot point remain relatively low in relation to the vertical component of the bearing force due to the high intrinsic weight of the rotatable assembly. This contributes to a high tilting stability of the stationary frame, which means that it does not have to be excessively ballasted or anchored. The width or depth of the base can remain comparatively small. This type of return mechanism does not apply a moment to the frame, which helps to stabilize the frame. Non-weight force restoring mechanisms, as discussed above, always apply a moment to the frame, which can cause the frame to tip over.

Accordingly, the invention preferably provides for a counterweight or restoring weight in the lower part of the frame, which generates at least part of the return forces when the solar panel is deflected, for example by a geo-force. The elastic, mechanical, electromechanical, magnetic, electromagnetic forces mentioned above can be used as additional forces to, for example, specify a minimum deflection force that can act on the solar panel before it deflects from the load. It is clear to those skilled in the art that, in addition to gravitational restoring forces, mechanical or electrical spring-damper systems can also be installed as a restoring system. However, a gravitational reset appears to be the most economical.

Various materials can be used for the counterweight/restoring weight, preferably those with a high specific weight, such as metals, sand, water, concrete, etc. In particular, the use of concrete allows a high degree of design freedom at economically justifiable costs. For example, a magnet, a magnet holder, a magnetic metallic or a counterelement holder can be inexpensively incorporated in the appropriate position during the production of a concrete counterweight by fixing it in the formwork, whereby the costs for a concrete counterweight are far below the costs for a counterweight made of solid metal, which would also have to be protected against the effects of the weather.

In a preferred embodiment of the restoring weight, the restoring weight has recesses by means of which the restoring weight and/or the solar installation together with the restoring weight, which is mounted in a rotationally fixed manner on the frame, can be moved by a transport device, such as a forklift. The recesses preferably have the shape of the fingers of a forklift truck or pallet truck and are modeled on the recesses of an industrial pallet, for example. This design not only allows the restoring weights themselves to be moved by means of a transport device, but also the mounted solar system, since the frame with the solar panel mounted in it and the restoring weight can then be transported standing or lying on the fork of a forklift, depending on where the recesses are arranged. In the land-based variant, the frame can hang vertically downwards if the recesses in the restoring weight point downwards. If, on the other hand, the recesses point to the front or back, the solar system can be transported horizontally on the forklift and the frame can hang vertically downwards because it can rotate around the tilting axis. To prevent the frame from swinging back and forth unintentionally during transport, a locking device can be used to block the rotation between the frame and the rack. This can also be used during standing transport to prevent the solar panels from hitting each other when several solar systems are transported at the same time.

When installing the solar system according to the invention, the preferred concrete restoring weights according to the invention are produced, for example, on site when setting up a solar park or solar system, and do not have to be transported. For this purpose, it is preferred to transport the empty formwork to the installation site and to fill it with concrete that is either prepared on site or is delivered to the site. The formwork is designed so that its long sides can be lined up one behind the other on a surface without gaps and adjacent, touching side surfaces are at approximately the same height, with the transverse side surfaces being higher. The filling of non-cured concrete mass can now be carried out in such a way that non-cured concrete mass that overflows a form runs into at least one of the adjacent forms and fills it. Due to the higher side surfaces, the concrete only flows between adjacent forms, and several restoring weights can be formed simultaneously with one concrete casting.

Furthermore, before the non-hardened concrete mass is poured in, inserts such as transport eyes or striking eyes, fastening elements or magnetic elements are placed in the respective formwork in such a way that they do not float up when the non-hardened concrete mass is poured in and are arranged in a predetermined position within the solar system after the concrete mass has hardened.

Preference is given to the solar system with horizontal solar panels, i.e., the frame—in the simplest case two rails—lies flat on a table, for example, and the solar panel is attached to it. The counterweight can also be attached to the frame in the same position. If the solar panels are to be transported to the installation site in a horizontal position, the recesses in the counterweight should face downwards so that the fully assembled solar panels can be picked up with a fork of the transport device and brought to the installation site. However, if the recesses in the restoring weight are facing away from the solar panel, the solar system must be lifted onto the fork and can be transported to the installation site in an upright position and set down there directly. If the system is transported in a horizontal position, it can be set up at the installation site.

In summary, it can be said that in an alternative design, vertical solar systems can be arranged like a row of pearls on a straight rod, for example. Arranged on the straight rod, the individual suspensions act independently, for example. The wind alignment does not necessarily have to be the same for all panels, but it can be done together. A solution aligned along a rope, like a row of pearls, can mean a breakthrough for floating solar systems. This solar "pearl chain" can be stretched along a water surface or other liquid surface using floats along the straight rod or rope or on the solar connection itself. Geometric forces such as wind, currents and waves tilt the individual segments out of the direction of force. This method can be used to significantly reduce the force acting on the system. It is even conceivable that the entire system could be operated partly or permanently under water in a floating state. Technologically, this arrangement can easily be designed so that the straight rod or rope forms an arc. Like a chain of pearls, the pearls can be "twisted" or deflected here as a synonym for the solar connections. The entire chain can, however, be deflected in any arc, for example, sagging or floating in an arc in the water, or in one deflected by a prevailing wind or flow direction on the water surface or in the air. In addition to the preferred technical and mechanical simplification, systems of this type built on water have the decisive advantage that they have only very little surface coverage compared to known solutions. Due to the essentially vertical mounting, the surface coverage or surface sealing is in line with the surface of the front edges of solar modules on land as well as floating on or in a liquid. This considerably reduces the possible impact on flora, fauna and habitat of water bodies and supports the natural biological cycle.

Solar energy systems that are aligned with the forces of the earth can also make good sense in elevated constructions on buildings. Especially in a flat, vertical east-west orientation of the solar surfaces, these arrangements support, in addition to the mechanical and economic improvements, typical consumption profiles in daily life, which are characterized by quite high consumption values in the morning and evening, while horizontal solar panels then only provide a small amount of electricity.

The same applies to their use as agri-solar energy systems. Because they flex with the forces, these systems can be simply raised on the ground with a light weighting as a "solar fence" or parallel "solar fences" without using solid weighting or installing posts in the ground, without the risk of them falling over in a storm.

When tensioned ropes are used to span an area, agriculture, roads, or any other parallel use of the area below is possible.

The essentially vertical arrangements also lead to environmental benefits on land. Soil sealing is close to zero for both the hanging and standing solutions.

Due to the simplified mounting options, breaking through the ground surface can be avoided.

Even the parallel application over forest areas, roads or elsewhere can be set up easily and without significant environmental impact using the "suspended" solution.

In the following, the solar energy system according to the invention is explained in further detail, also graphically, on the basis of preferred embodiments. However, these embodiments do not limit the scope of the invention.

DETAILED DESCRIPTION OF THE INVENTION

In the following detailed description of the figures, the same reference signs are used for the same or equivalent objects to improve readability.

Figure 1:
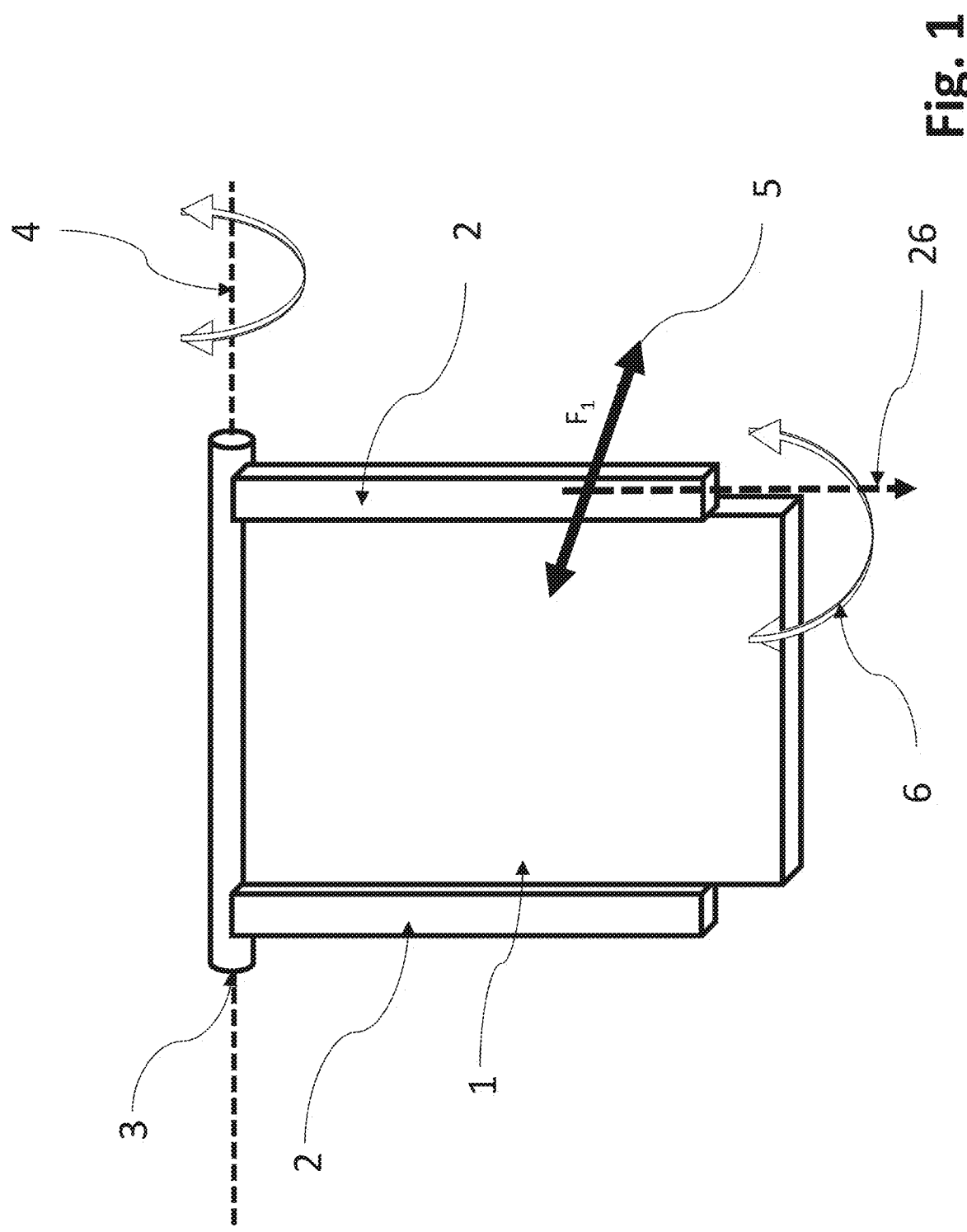
FIG. 1 shows a solar energy system that is essentially hanging vertically, as known, for example, from the prior art.

FIG. 1 shows a solar energy system that is essentially hanging vertically, as is known, for example, from the prior art. Due to the upper axial, rotatable suspension and its own weight, it hangs vertically downwards in the resting state. When external forces act vertically on the solar surface of solar panel 1, the solar energy system can yield in the direction of the force and tilt in the direction of the force, so that the force on the entire system is greatly reduced.

Reference sign 1 describes the solar plate/solar panel 1, which is essentially vertical. It is held vertically downwards by gravity. Reference sign 2 describes a frame 2 to which the solar plate 1 is attached or in which the solar panel 1 is held. Reference sign 3 describes the shaft 3 around which the suspension or the solar plate 1 can rotate. Reference sign 4 describes the axis 4 around which the solar energy system can rotate. Reference sign 5 describes the force 5 that is exerted essentially perpendicular to the solar plate 1 or the solar surface by a geo-force, such as flow or impulse. For example, this could be wind or waterpower. Reference number 6 describes the direction of deflection or folding of the solar energy system, essentially perpendicular to the solar surface. Reference number 26 describes the weight force pointing downwards in the vertical direction and the direction of gravity.

Figure 2:
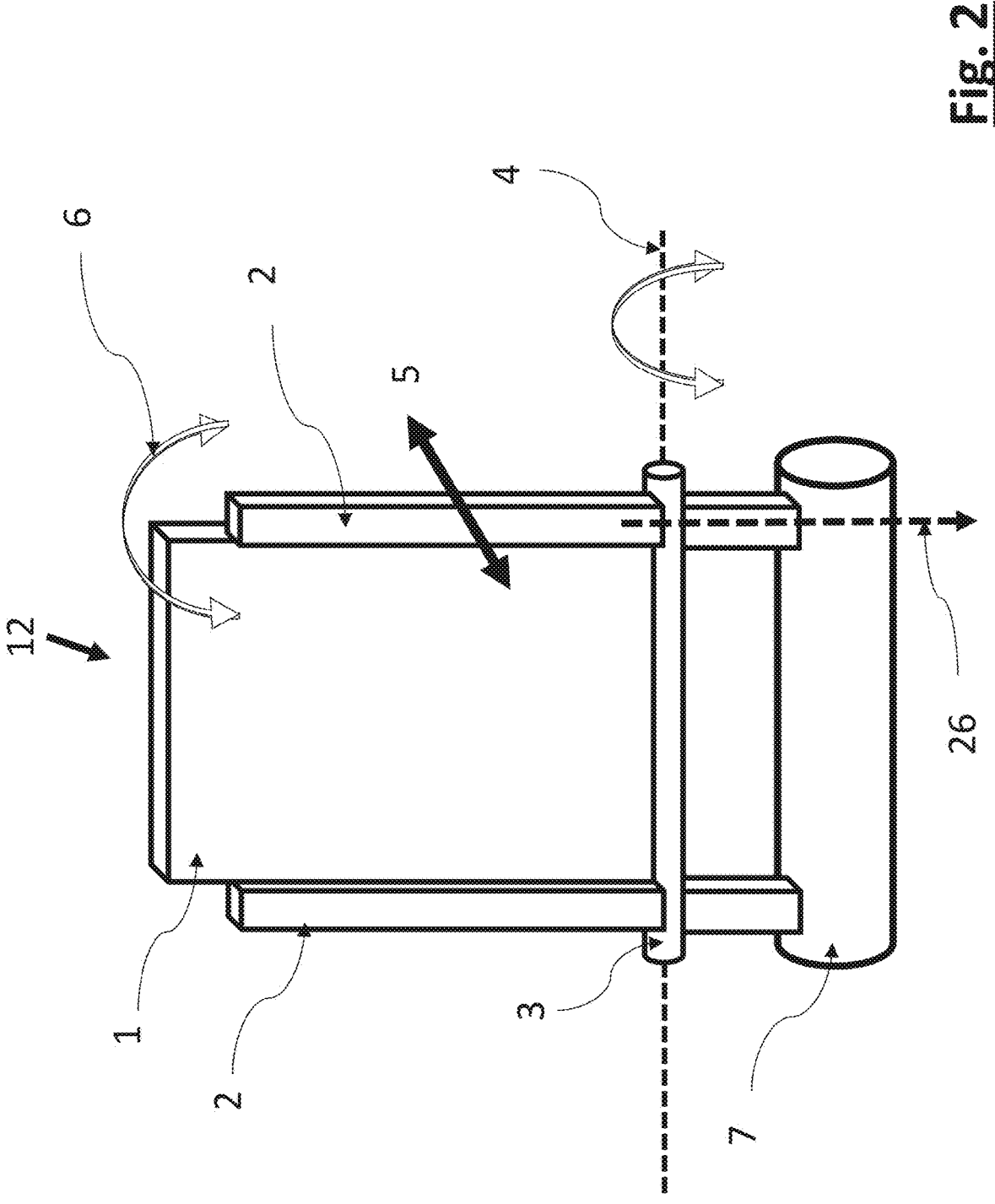
FIG. 2 shows an essentially vertically standing solar energy system according to a first embodiment of the invention.

FIG. 2 describes a solar energy system that is essentially vertical, according to a first embodiment of the invention. A weight 7, for example a pendulum weight, is located under the pivot/tilt axis 4. This can be located directly under the axis 4 in the axis body 3 or can also be arranged at a distance from the axis body 3 in order to create a higher lever arm. The weight 7 is dimensioned so that the solar energy system is essentially vertical in the resting state or is repeatedly pushed into the starting position when it tilts. External forces perpendicular to the solar surface or the solar panel 1 allow the solar energy system to move out of the way in the direction of the force and tilt in the direction of the force, so that the force on the entire system is greatly reduced. When the external force decreases, the solar energy system swings back to its resting state, i.e., to the starting position.

Reference sign 1 also describes the solar plate here, i.e., solar panel 1, whose orientation in the initial position is essentially vertical. Reference sign 2 describes the frame 2 to which the solar plate is attached. Reference sign 3 describes the shaft or axle body 3 around which the suspension or solar plate can rotate. Reference sign 4 describes the tilting axis 4 around which the solar energy system can rotate. Reference sign 5 describes the force, for example caused by a geo-force, such as flow or impulse, essentially perpendicular to the solar plate 1 or the solar surface. For example, this can be wind or waterpower. Reference sign 6 describes the direction of deflection or tilting 6 of the solar energy system, essentially perpendicular to the solar panel surface 1. Reference sign 7 describes the weight or restoring weight 7, which is large enough to ensure that the center of gravity of the solar energy system lies in the direction of gravity below the tilt and turn axis 4. Reference symbol 26 describes the vertical or downward pointing 26 or the direction of gravity.

FIG. 2 clearly shows that the at least one solar panel 1 is accommodated in a frame 2 which is formed laterally, for example, by two rail-like strips which are connected to an axle body 3 in the lower region. The strips protrude beyond the axle body to the other side of the solar panel 1 and can thus be used to attach a restoring weight 7 there, which is arranged in the starting position of the solar energy system according to the invention in a vertical extension of the frame 2 with respect to the tilting axis 4 opposite the solar panel 1. As a person skilled in the art can easily understand, a force 5 on the solar panel 1 can rotate the solar energy system about the tilting axis 4, with the restoring weight 7 generating a counterforce to this.

Figure 3:
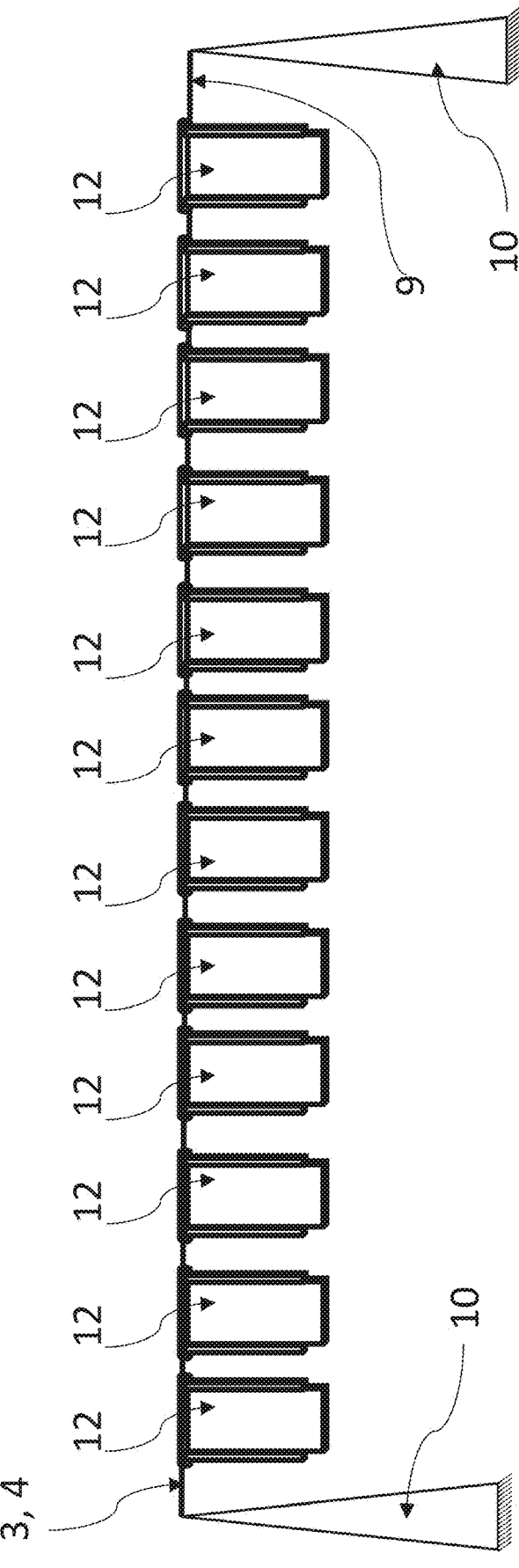
FIG. 3 shows a combination of solar energy systems according to FIG. 1 known from the prior art.
Figure 3:

FIG. 3 describes a known prior art combination of suspended solar energy systems according to FIG. 1, which are suspended on the same axis 4, for example a shaft 3, a rod or a cable. Reference sign 9 describes an axle, a shaft 3, a rod or a cable or a comparable suspension. Reference sign 10 describes an anchor point. This can be a stand, a pole, a building, a tree, a rock, or any type of connection. The reference signs 12 here describe the solar arrays from FIG. 2, which can consist of one or more solar modules/solar panels 1.

Figure 4:
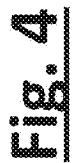
FIG. 4 shows a group of solar energy systems according to FIG. 3, known from the prior art.

FIG. 4 describes an array of solar energy systems according to FIG. 3, which is known from the prior art, whereby the solar energy systems 12 can be lined up next to each other or behind each other. The individual rows can be ascending or descending, and the shaft 3, for example a cable, or the axle 4 can also be bent by the weight of the solar energy systems 12. Furthermore, the rows can be fixed at different heights. The spacing of the rows as well as the alignment and height are selected so that they shade each other as little as possible. In the same way, a height can be selected so that the land beneath the rows can be used for other purposes. Examples include vehicle operation, agricultural use, pedestrian paths, buildings, forests, ravines, water bodies or similar things. Reference sign 11 describes a suspended solar energy system according to FIG. 3.

Figure 5:
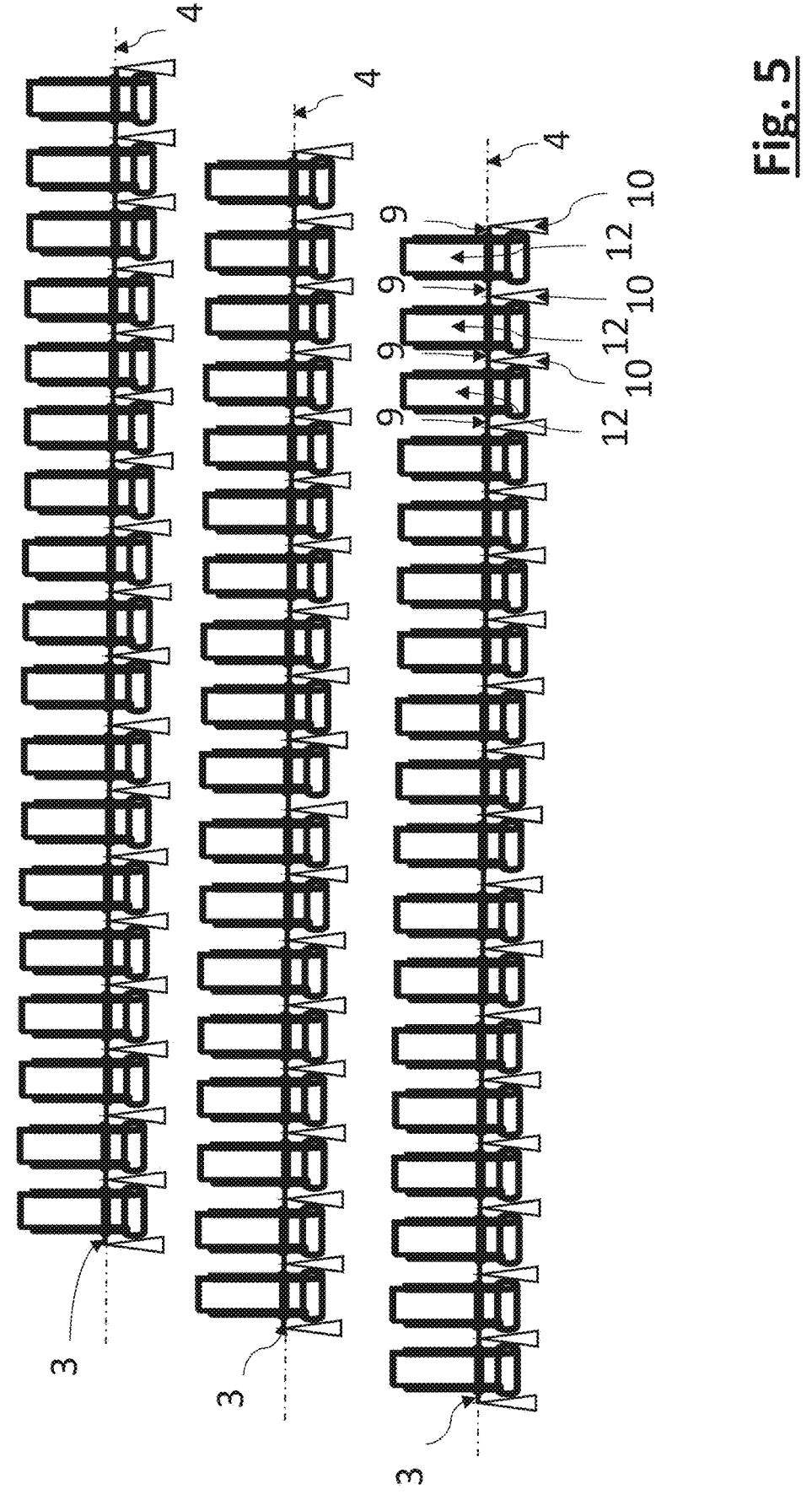
FIG. 5 shows a group of solar energy systems according to FIG. 2.

FIG. 5 describes a network of upright solar energy systems 12 according to FIG. 2, which can be lined up next to each other or behind each other. Each individual row can be ascending or descending, and the axis 4 can also be bent by the weight of the solar energy systems 12. Furthermore, the rows can be fixed at different heights. The spacing of the rows as well as the alignment and height are selected so that they shade each other as little as possible. In the same way, a height can be selected so that the land below the rows can still be used for other purposes. Examples include vehicle operation, agricultural use, pedestrian paths, buildings, forests, ravines, water bodies or the like. Reference sign 9 describes a tilting axle 4 which is a shaft 3, a rod or a rope or a comparable suspension. Reference sign 10 describes anchor points. This can be a stand, a pole, a building, a tree, a rock, or any type of connection. Reference sign 12 describes the solar energy systems of FIG. 2, which may consist of one or more solar modules/solar panels 1.

Figure 6:
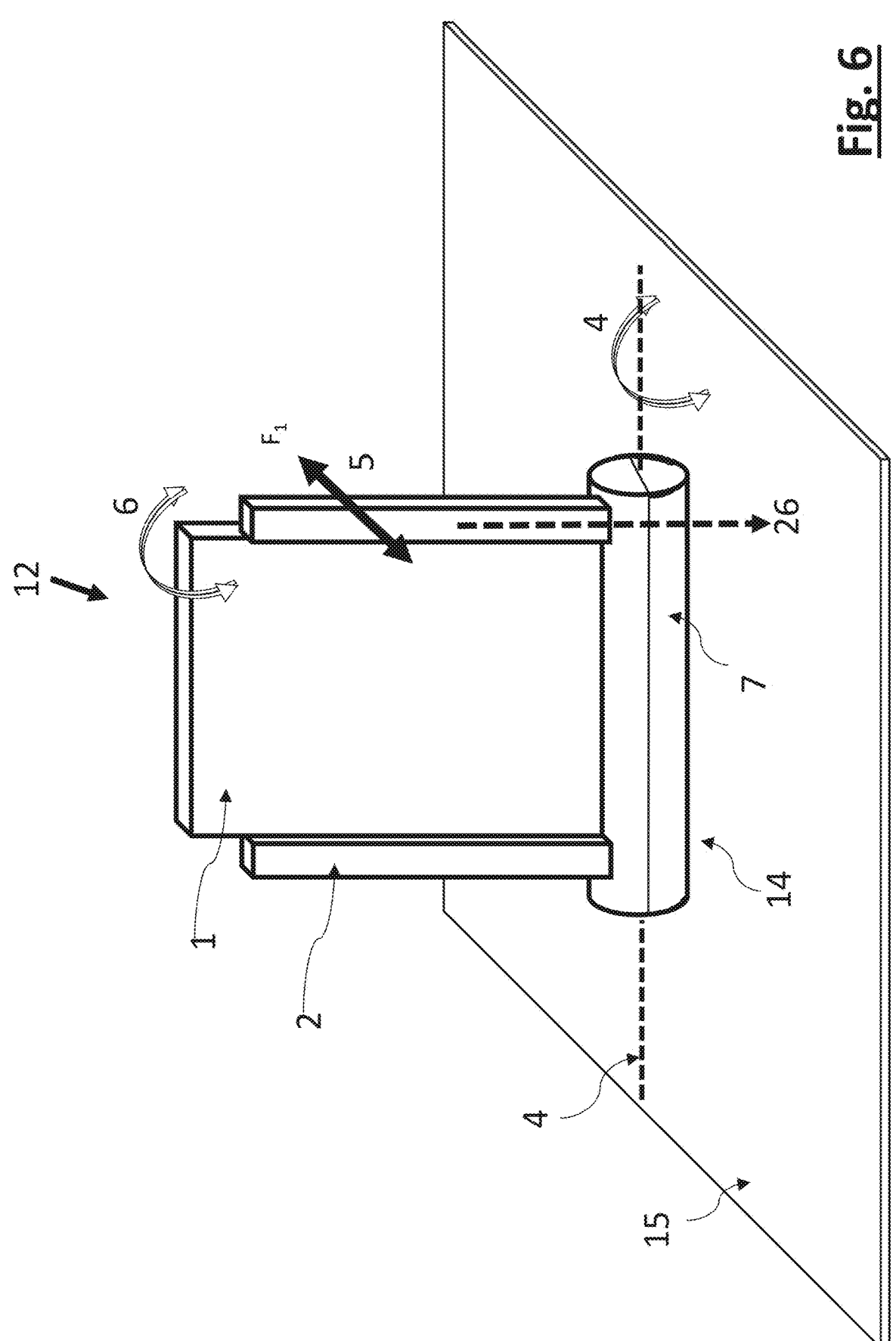
FIG. 6 shows a solar energy system standing on an essentially horizontal surface according to a second embodiment of the invention.

FIG. 6 describes a solar energy system 12 standing on a substantially horizontal surface according to a second embodiment of the invention. Similar to the principle in FIG. 2, the center of gravity here is below the axis of rotation 4 due to the construction. The lower body of the solar energy system 12, which touches the surface, is curved in such a way that the solar energy system always returns to the essentially vertical position after tilting due to the pendulum weight 7, similar to a "stand-up man".

Reference sign 1 describes the solar panel 1, the orientation of which is essentially vertical. Reference sign 2 describes the frame 2 to which the solar panel 1 is attached. Reference sign 3 describes the shaft 3 about which the suspension or solar panel 1 can rotate. Reference sign 4 describes the tilt axis 4 about which the solar energy system 12 can rotate. Reference sign 5 describes the force 5 by geo-force, such as flow or impulse, directed essentially vertically onto the solar plate or solar surface. This can be wind or waterpower, for example. Reference sign 6 describes the deflection direction 6 or folding direction 6 of the solar energy system, essentially perpendicular to the solar surface of the solar panel 1. Reference sign 14 describes the axle body 3, which is oval or rounded on the underside. A pendulum weight 7 (hatched area) is inserted into this body 3 under the axis of rotation 4, so that the center of gravity is located under the axis of rotation 4. This is designed in such a way that the solar energy system 12, after tilting, is always pushed back into the essentially vertical (starting) position. Reference sign 15 describes a (support) surface. This can be a roof, a ground surface, or another surface. Reference sign 26 describes the vertical downwards or the direction of gravity 26.

Figure 7:
FIG. 7 shows a group of solar energy systems according to FIG. 6, next to each other.

FIG. 7 describes a combination of systems next to each other according to FIG. 6. Reference sign (16) indicates the systems according to FIG. 6.

Figure 8:
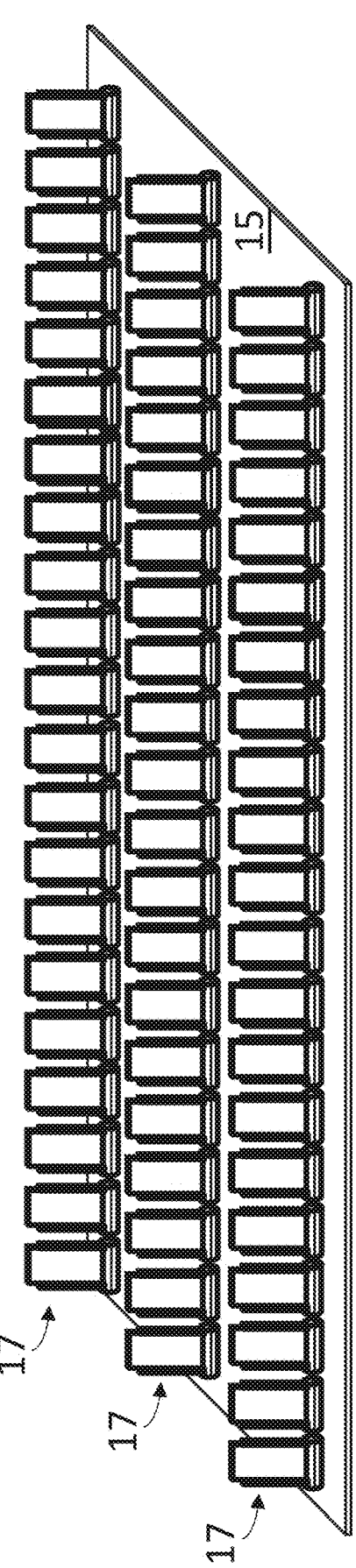
FIG. 8 shows a network of solar energy systems as in FIG. 6, next to each other and in series.
Figure 8:

FIG. 8 describes a combination of solar energy systems as shown in FIGS. 6 and 7 side by side and one behind the other. It is obvious that these can also be set up in any other arrangement on the surface. Reference number 17 describes the systems in FIG. 7

Figure 9:
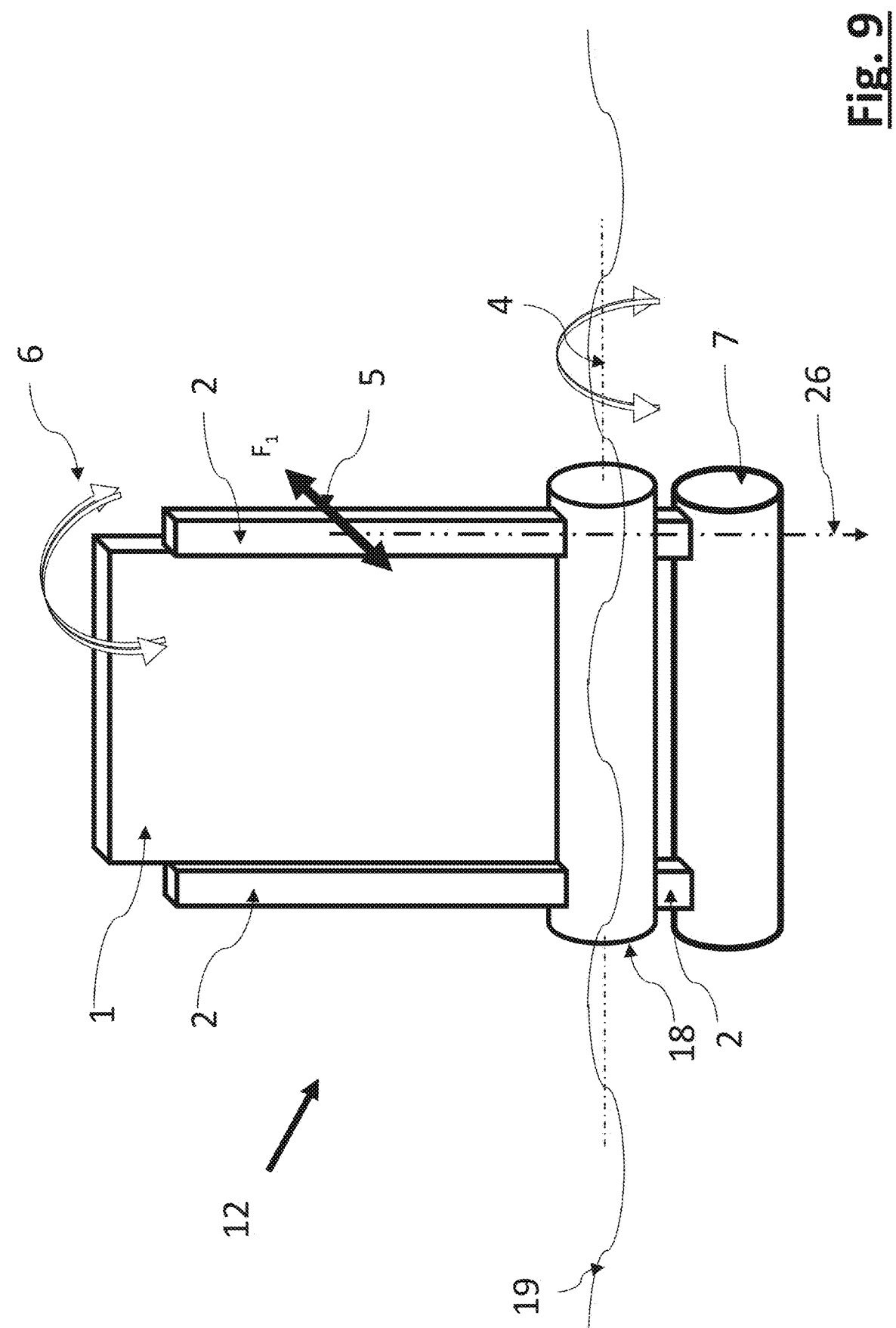
FIG. 9 shows a solar energy system according to a third embodiment of the invention, based on the principle of FIG. 2.

FIG. 9 describes a solar energy system according to a third embodiment based on the principle shown in FIG. 2, whereby a buoyancy body 18 is mounted on the axis 4 so that the solar energy system 12 can float on liquids, e.g., water. Of course, this can also be done according to FIG. 1, so that the solar modules would hang below a liquid surface. The solar energy systems can withstand horizontal forces and impulses as well as currents. The system is designed in such a way that the solar energy system tilts in the direction of the force even in the event of water currents or spilling waves, for example, and damage is avoided or the force 5 on the solar energy systems 12 is greatly reduced.

Reference sign 1 describes the solar panel 1, the orientation of which is essentially vertical. Reference sign 2 describes the frame 2 to which the solar panel 1 is attached. Reference sign 3 describes the shaft 3 about which the suspension or solar panel 1 can rotate. Reference sign 4 describes the tilting axis 4 about which the solar energy system 12 can rotate. The tilting axis 4 does not have to coincide with the axis of rotation of the buoyancy body, as shown in FIG. 9, but is essentially determined by the buoyancy force with which the buoyancy body holds the solar energy system 12 above the water surface 19. In principle, the tilting axis runs along the water surface 19. Reference sign 5 describes the deflection force 5, which is generated, for example, by geo-force, such as current or momentum, essentially perpendicular to the solar panel 1 or the solar surface. For example, this can be wind or waterpower. Reference sign 6 describes the deflection direction or folding direction 6 of the solar energy system 12, essentially perpendicular to the solar surface of the solar panel 1. Reference sign 7 describes the weight or restoring weight 7, which is so large that the center of gravity of the solar energy system 12 lies below the axis of rotation 4 in the direction of gravity 26. Reference sign 18 describes a floating body or buoyancy body 18, which can be of any design and can either be firmly connected to the solar energy system 12 or generate the buoyancy via the axis 4. Reference sign 19 describes the surface of a liquid. Reference sign 26 describes the vertical downwards or the gravitational direction 26. The other components correspond to the first embodiment according to the invention as shown in FIG. 2.

Figure 10:
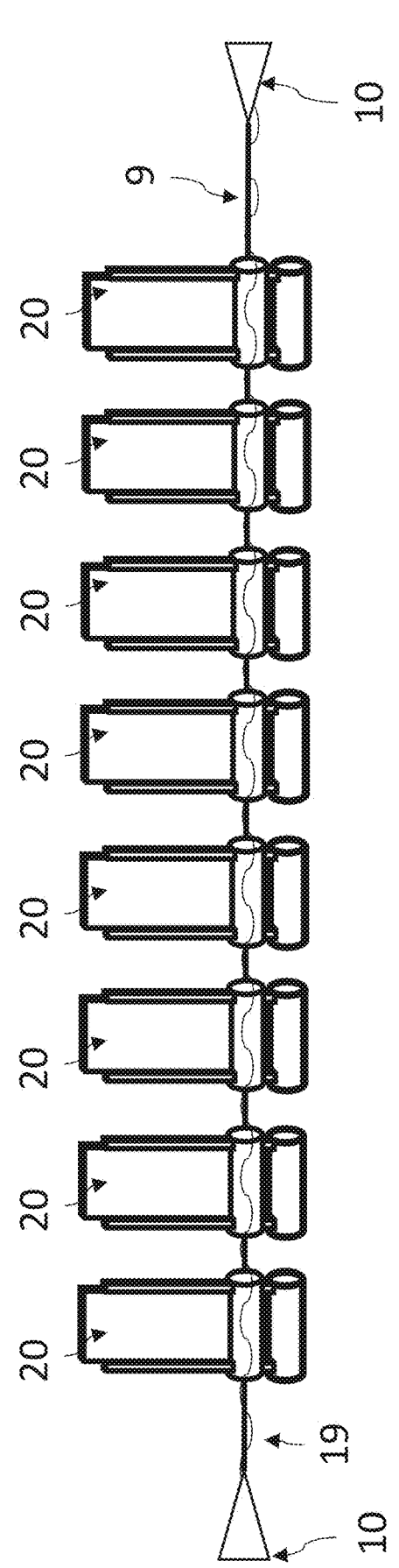
FIG. 10 shows a network of floating solar energy systems as in FIG. 9.

FIG. 10 describes a floating solar energy system assembly that floats on a liquid surface 19. Here, the individual solar energy systems 12 according to FIG. 9 are connected by a cable 9 or a rigid or flexible axial connection, e.g., to one or more shafts 3. The individual solar energy systems 12 can tilt individually, in groups and/or together when a deflection force acts on them. To group the solar energy systems, they can be connected to each other via their respective frames, for example, whereby in such an embodiment several solar energy systems can also share a buoyancy body, which then determines the tilting axis position by its water contact surface.

The tilting axle 4 is held at least at the outer ends, e.g., at anchor points 10. However, it can also be held several times. The holding points can be anchors with buoys, land connections, floating bodies or similar. The system does not necessarily have to be stationary but can also be attached to one side of a boat, for example. It is obvious that the connecting axis 9 does not necessarily have to be straight, but can, for example, be bent by external forces such as wind and waves. Reference sign 9 describes an axis, which can be a shaft, a rod or a rope or a comparable suspension. Reference sign 10 describes anchor points. This can be a buoy, a boat, a land attachment, floating, floatingly fixed or anchored or fixed in the water or on land. Reference sign 19 describes a liquid surface. Reference sign 20 describes the solar energy systems according to FIG. 9.

Figure 11:
FIG. 11 shows a network of floating solar energy systems according to FIG. 9, next to and behind one another.

FIG. 11 describes a group of floating solar energy systems according to FIG. 10, side by side and one behind the other. Reference sign 21 denotes floating solar energy systems according to FIG. 10.

Figure 12:
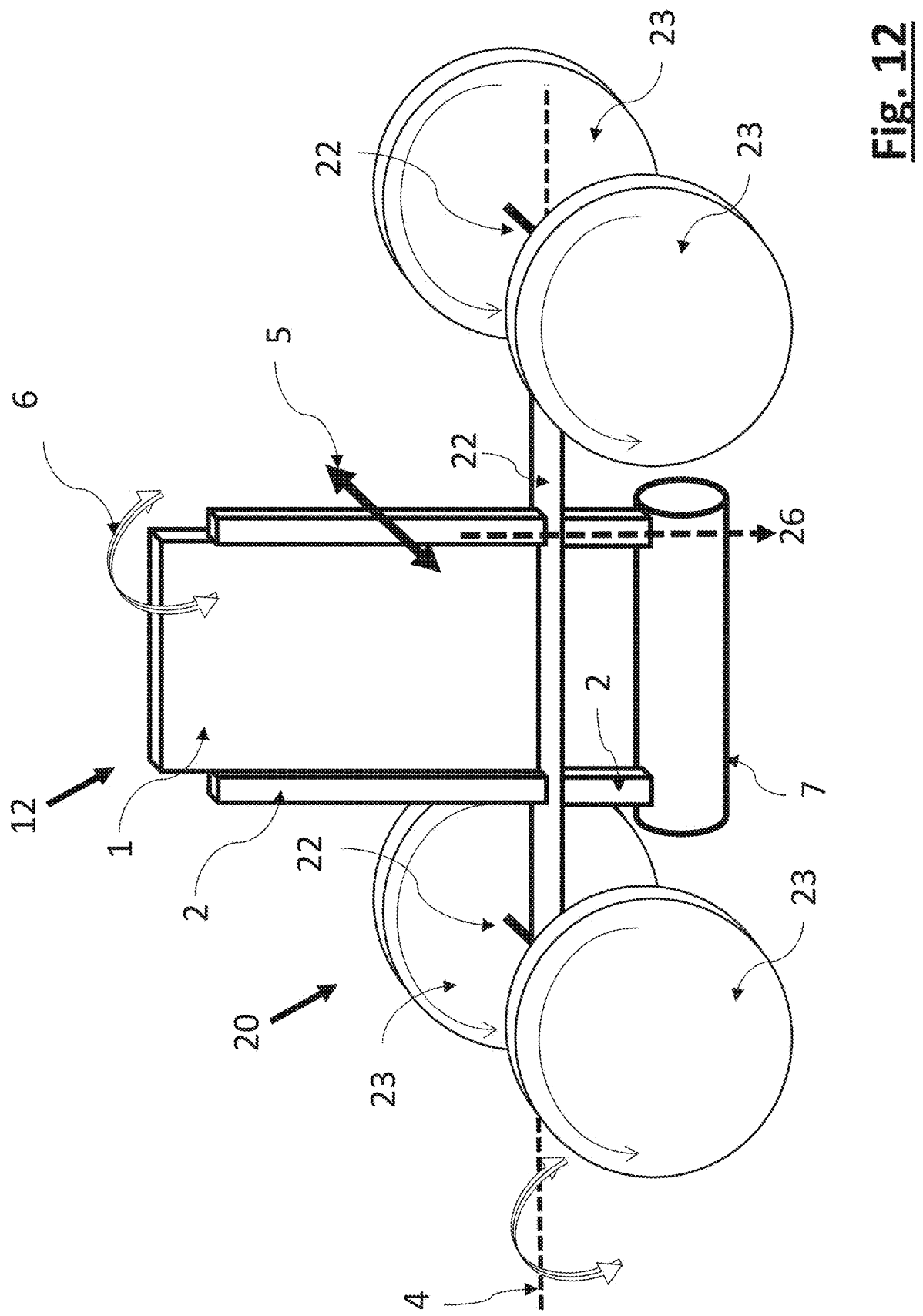
FIG. 12 shows a solar energy system according to a fourth embodiment of the invention, based on the principle of FIG. 2.

FIG. 12 describes a fourth embodiment of the solar energy system 12 according to the principle of FIG. 2 or one of the other principles according to the invention. Here, the solar energy system 12 is installed on a mobile carriage 20. Reference sign 1 describes the solar panel 1, the orientation of which is essentially vertical. Reference sign 2 describes the frame 2 to which the solar panel is attached. Reference sign 3 describes the shaft 3 about which the suspension or the solar panel 1 can rotate. Reference sign 4 describes the tilt axis 4 about which the solar energy system 12 can rotate. Reference sign 5 describes the deflection force 5 caused by geo-force, such as wind, flow or impulse, essentially perpendicular to the solar panel 1 or the solar surface. For example, this can be wind or water force. Reference sign 6 describes the direction of deflection 6 or tilting direction of the solar energy system 12, essentially perpendicular to the solar surface of the solar panel 1. Reference sign 7 describes the weight or restoring weight 7, which is so large that the center of gravity of the solar energy system lies below the axis of rotation 4 in the direction of gravity 26. Reference sign 22 describes the chassis 22 of the vehicle. Reference sign 23 describes the wheels 23 of the vehicle 20, which can be driven and steerable. Reference sign 26 describes the vertical downwards or the direction of gravity 26.

Figure 13:
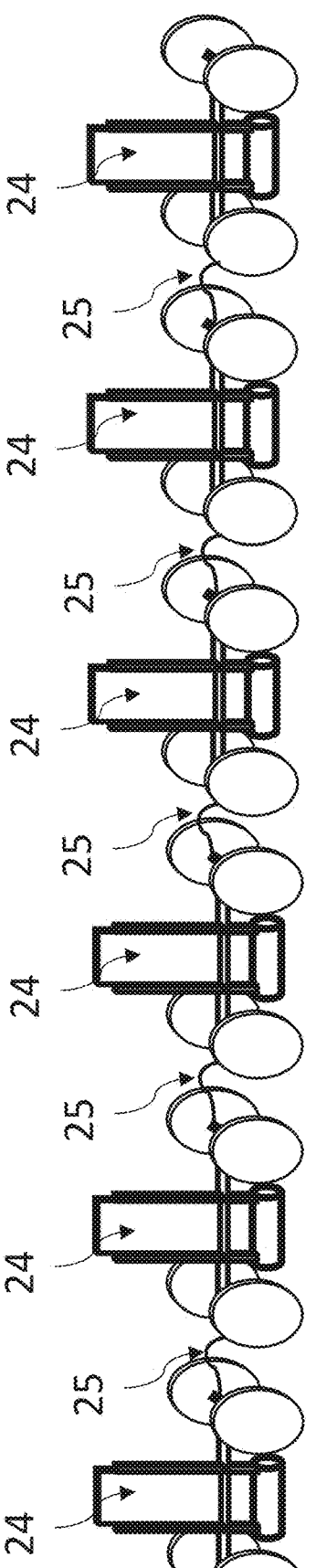
FIG. 13 shows a chain of mobile solar energy systems according to FIG. 12.

FIG. 13 describes a chain-linking of mobile solar energy systems according to FIG. 12, in which the solar energy systems 24 are connected to each other like a railroad or railroad wagons with flexible connectors 25. Reference sign 24 describes the solar energy systems 24 according to FIG. 12. Reference sign 25 describes the flexible connecting axles between the wagons 20.

Figure 14:
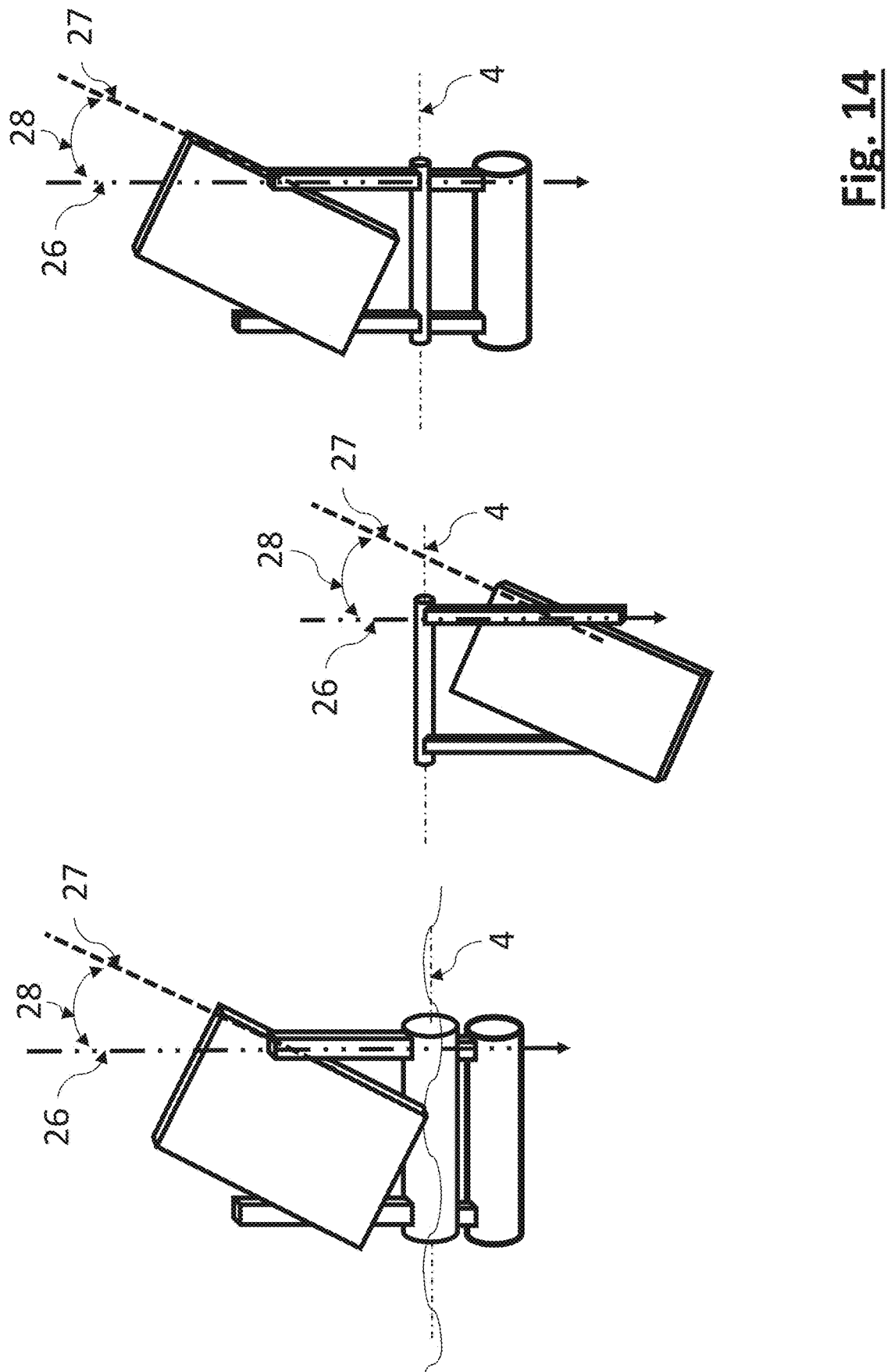
FIG. 14 shows an angular connection of the solar modules in the basic state.

FIG. 14 describes an angled connection of the solar modules 1 in the basic state. This can improve the performance values when oriented to the south. All principles of the solar energy systems from FIG. 1, FIG. 2, FIG. 6, FIG. 9, or FIG. 12 can be used equally here. Reference mark 26 describes the vertical downwards or the direction of gravity 26. Reference mark 27 describes the axial deviation 27 of the solar surface from the direction of gravity 26 in the initial state. Reference sign 28 is the angle between the gravitational direction 26 and the axis deviation 27.

Figures 15, 17:
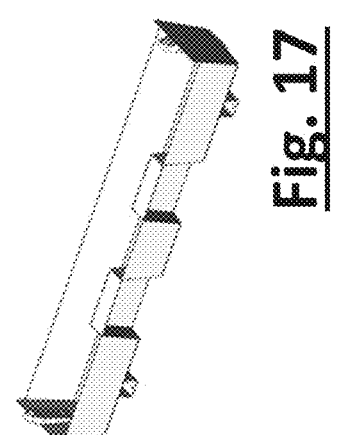
FIG. 15 shows an exploded view of the first embodiment of the solar energy system according to the invention.
FIG. 17 shows a formwork form for manufacturing a restoring weight according to the invention.

FIG. 15 shows an exploded view of the first embodiment of the solar energy system 12 according to the invention, which follows the principles as shown in FIGS. 2 and 5. The ground- or surface-supported embodiment shown in FIG. 15, which can also be mounted on a loading surface of a mobile device, e.g. a vehicle, a railroad or a ship, has at least one solar panel 1 which is oriented essentially vertically in the starting position or rest position. The solar panel 1 is held by two longitudinal profiles attached to the side of the solar panel 1, which are connected below the solar panel 1 with a restoring weight 7 to form an upwardly open frame 2. The frame 2 is connected, for example, in the vertically lower area of the solar panel 1 via shafts 3, which define the tilting axis 4, to a frame 1, which can be fixed to a floor or a loading surface. The solar panel 1 shown in FIG. 15 can thus be tilted out of the starting position about a substantially horizontal tilting axis 4 extending below the solar panel 1 when a deflection force 5 acts on the solar panel 1 transversely to the tilting axis 4. When the deflection force 5 decreases, the frame 2 can automatically return about the tilting axis 4 towards the starting position due to the counterforce generated by the restoring weight 7.

In the embodiment shown in FIG. 15, the two feet of the frame 11 are connected to a crossbar 34, which is made of a magnetic metal, for example, or to which a magnetic metal element can be attached. Opposite the restoring weight 7, a magnet, for example a permanent magnet, can be arranged fixedly or elastically with the restoring weight in such a way that the magnet attracts the magnetic metal element in the initial/starting position of the solar energy system 12 and holds the solar energy system 12 in a kind of magnetic detent, so that a minimum value can be preset for the deflection of the solar energy system 12 by a force acting on the solar panel 1. As the skilled person can easily recognize, the magnet/magnetic metal element arrangement can also be reversed without any particular effort, so that the magnet is attached to the strut 34, for example flexibly by means of a leaf spring, a rubber tab or the like. A ferromagnetic material, for example a steel sheet, is then cast into the restoring weight. Preferably, either the magnet or the magnetic counterpart is cast into the concrete mass of a restoring weight cast from concrete.

In the case of the metal version of the restoring weight 7, it may be sufficient to attach only one magnet to the strut 34 of the frame 11. In this case, the skilled person will find equivalent solutions that can be used to create a locking/latching mechanism of the tiltable solar panel 1 that can be overcome by a minimum deflection force. The solution with a magnet is only one of many possibilities. Spring, friction force or damper solutions are just as conceivable here and are therefore covered by the spirit of the invention.

Figure 16:
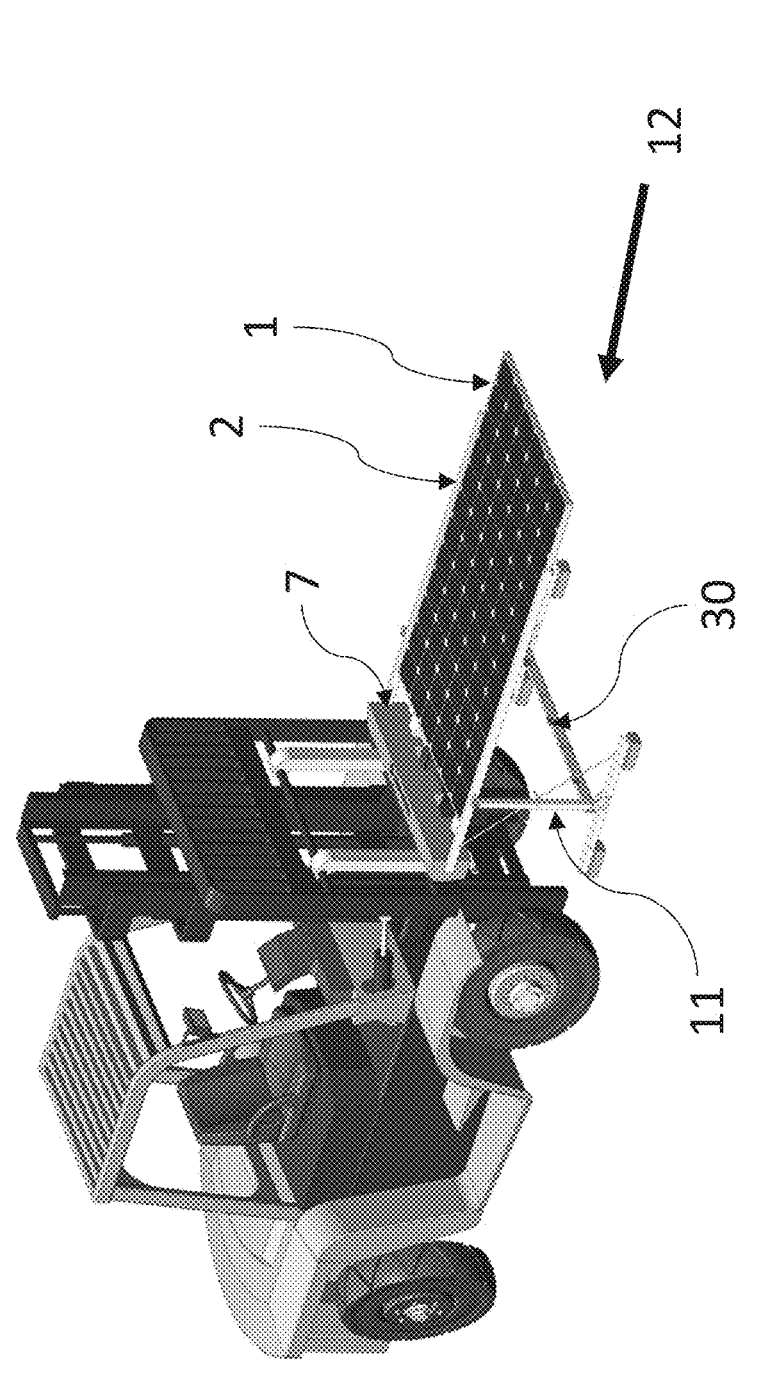
FIG. 16 shows the transportation of a solar energy system according to the invention.

The restoring weight 7 shown in FIG. 15 is, for example, a cast body made of concrete, which has two recesses on at least one of the surfaces parallel to the solar panel 1, which make it possible to transport the restoring weight 7 alone or the entire solar energy system 12 by means of a transport device. Such an exemplary transport is shown in FIG. 16.

FIG. 17 shows a formwork form for producing a restoring weight 7 according to the invention, whereby the walls of the long sides are lower than those of the lateral sides. In this way, several formwork forms can be filled simultaneously with their long sides adjacent to each other in one concrete casting process, as excess concrete can flow from one formwork form to the next and the higher lateral sides prevent the liquid concrete mass from flowing off to the side. Preferably, before the formwork forms are filled with concrete, inserts such as transport eyes, fastening elements or magnetic elements are inserted into the respective formwork forms in such a way that they do not float during the filling of the uncured concrete mass and are arranged in a predetermined position within the solar energy system 12 after the concrete mass has cured.

Overall, the invention provides a cost-effective, modular, and robust solution for setting up solar panels 1 on land or water, whereby the solar energy systems 12 according to the invention can be used either stationary, transportable from one place to another or movable/mobile. Due to the tiltable design of the solar panels, high-strength anchoring, such as anchoring by means of foundations, is often not necessary; instead, sufficient weighting of the land-based embodiment is sufficient. For the floating embodiment, a connection to an anchor point is sufficient to keep the solar energy systems 12 in the desired east-west orientation and secure them against floating away. Here, bi-facial solar panels 1 are used, which can generate solar power on both sides, which is particularly preferable on the water due to the reflection effect.

The invention claimed is:

1. A solar energy system comprising:

at least one solar panel which is fixedly accommodated in a frame which is aligned in a substantially vertical or upright default position and which holds the solar panel in a substantially vertically or upright position, wherein the frame can be tilted out of the default position about a substantially horizontal tilting axis extending in a vertically lower region of the solar panel or about a substantially horizontal tilting axis extending below the solar panel when a deflection force acts on the solar panel transversely to the tilting axis, and the frame automatically returns about the tilting axis in a direction of the default position by means of a restoring weight arranged in a gravitational direction below the tilting axis when the deflection force is released, wherein the solar energy system is intended for use for elevation in an east-west orientation and the at least one solar panel is a bi-facial solar panel.

2. The solar energy system according to claim 1, wherein the frame is open at a top.

3. The solar energy system according to claim 1, wherein with respect to the vertical position, the solar panel is received in the frame rotated about a substantially horizontal axis.

4. The solar energy system according to claim 1, wherein geo-influences cause the deflection force.

5. The solar energy system according to claim 1, in which the restoring weight is formed in a form of a convexly curved pedestal transverse to the tilting axis, on which the solar energy system can be tilted.

6. The solar energy system according to claim 1, in which the restoring weight is arranged with respect to the tilting axis opposite to the solar panel.

7. The solar energy system according to claim 1, in which the frame is fastened to a stationary elevation in such a way that the frame can be tilted about the tilting axis out of the default position and automatically returns about the tilting axis in the direction of the default position when a deflection force on the solar panel becomes less.

8. The solar energy system according to claim 1, in which the frame is repositioned in the direction of the default position with help of a spring force, an electrical or electromechanical force or a magnetostatic or electromagnetic force when the deflection force is reduced.

9. The solar energy system according to claim 8, in which the frame is held in the default position by a spring force, a mechanical, an electrical or electromechanical force or a magnetostatic or electromagnetic force, so that a predefined minimum deflection force is required to deflect the solar panel.

10. The solar energy system according to claim 1, wherein the solar energy system is installed on a mobile device.

11. The solar energy system according to claim 1, wherein a buoyancy body is attached to the frame, which is arranged between the solar panel and the restoring weight and is suitable for keeping the solar panel floating above a water surface.

12. The solar energy system according to claim 1, wherein the restoring weight is made of concrete or is a container filled with liquid, water, bulk material, gravel or sand.

13. The solar energy system according to claim 1, wherein the restoring weight has recesses by means of which the restoring weight and/or the solar energy system can be moved by a transport device together with the restoring weight mounted in a rotationally fixed manner on the frame.

14. The solar energy system according to claim 1, wherein a magnet or a magnetic counter element is rigidly or elastically attached to a movable part of the frame or to the restoring weight, wherein an associated magnetic counter element or magnet is correspondingly elastically or rigidly attached to a stationary part of the solar energy system.

15. A solar plant with several a plurality of the solar energy systems according to claim 1, wherein the solar energy systems are arranged on a common shaft comprising the tilting axis by means of the frame in such a way that the solar energy systems can tilt at least partially independently of each other about the tilting axis.

16. A solar plant comprising a plurality of the floating solar energy systems according to claim 11, wherein a row of the solar energy systems are connected to each other via the frames and/or the buoyancy bodies.

17. A method for mounting the solar energy system according to claim 1 or of a solar plant comprising a plurality of the solar energy systems according to claim 1, in which a plurality of formwork forms for concreting the restoring weights are designed in such a way that the plurality of formwork forms can be lined up one behind the other on a surface without spacing and wherein neighboring side surfaces touching each other have the same height and the side surfaces transverse thereto have a greater height, and a filling of non-cured concrete mass is carried out in such a way that liquid/non-cured concrete mass which runs over one formwork form runs into at least one neighboring formwork form.

18. The method according to claim 17, wherein before filling liquid/non-cured concrete mass into the plurality of formwork forms, inserts in the form of transport eyes, fastening elements or magnetic elements are introduced into the respective formwork forms in such a way that the formwork forms do not float during the filling of the liquid/non-cured concrete mass and are arranged in a predetermined position within the solar energy system after the concrete mass has cured, so that the formwork forms can be removed from the restoring weight after curing if necessary.

* * * * *